US012307458B2

(12) United States Patent
Mehla et al.

(10) Patent No.: US 12,307,458 B2
(45) Date of Patent: May 20, 2025

(54) REMOTELY SHARING A PAYMENT INSTRUMENT TO A CLIENT DEVICE

(71) Applicant: American Express Travel Related Services Company, Inc., New York, NY (US)

(72) Inventors: Pankaj Mehla, Phoenix, AZ (US); Anuj Goyal, Phoenix, AZ (US); Anthony Jaleel Wooten, Phoenix, AZ (US); Yogesh Edekar, Phoenix, AZ (US); Moses Godinez, Phoenix, AZ (US); Sridevi Majeti, Phoenix, AZ (US); Sharad Kumar, Phoenix, AZ (US); Nicholas Martinez, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 241 days.

(21) Appl. No.: 17/412,182

(22) Filed: Aug. 25, 2021

(65) Prior Publication Data

US 2023/0066397 A1 Mar. 2, 2023

(51) Int. Cl.
*G06Q 20/40* (2012.01)
*G06Q 20/06* (2012.01)
(Continued)

(52) U.S. Cl.
CPC ....... *G06Q 20/4014* (2013.01); *G06Q 20/065* (2013.01); *G06Q 20/227* (2013.01); *G06Q 20/363* (2013.01); *G06Q 20/405* (2013.01)

(58) Field of Classification Search
None
See application file for complete search history.

(56) References Cited

U.S. PATENT DOCUMENTS

| 8,622,309 | B1 * | 1/2014 | Mullen | G06K 19/06206 |
| | | | | 235/492 |
| 10,445,739 | B1 * | 10/2019 | Sahni | G06Q 20/405 |

(Continued)

FOREIGN PATENT DOCUMENTS

WO WO-2014011691 A1 * 1/2014 ........... G06Q 20/326

OTHER PUBLICATIONS

Colavecchia, S., "Family finances: A sociological study of the earning, managing, and spending of money in marital relationships", ProQuest Dissertations & Theses. (2005) (Year: 2005).*

*Primary Examiner* — Clay C Lee
(74) *Attorney, Agent, or Firm* — Thomas Horstemeyer, LLP

(57) ABSTRACT

Various embodiments for remotely sharing a payment instrument of a first user to a client device of a second user are provided. In some embodiments, a system is configured to receive a first request from a first client device to generate a beneficiary user for a payment instrument account. The system is configured to receive a second request from the first client device in order to generate a virtual payment instrument, and the second request comprises a spending policy. The system is configured to generate the virtual payment instrument for the beneficiary identifier based at least in part on the spending policy and configured to transmit a reference notification for accessing the virtual payment instrument to a second client device. The virtual payment instrument is configured to be restricted for a purchase based at least in part on the spending policy.

20 Claims, 9 Drawing Sheets

(51) Int. Cl.
*G06Q 20/22* (2012.01)
*G06Q 20/36* (2012.01)

(56) References Cited

U.S. PATENT DOCUMENTS

| | | | | |
|---|---|---|---|---|
| 11,489,842 B1* | 11/2022 | Russell | ............... | G06Q 20/40 |
| 2012/0253852 A1* | 10/2012 | Pourfallah | ........... | G06Q 20/327 |
| | | | | 705/41 |
| 2015/0186886 A1* | 7/2015 | Schwalb | .............. | G06Q 20/405 |
| | | | | 705/44 |
| 2016/0162882 A1* | 6/2016 | McClung, III | ....... | G06Q 20/352 |
| | | | | 705/41 |
| 2019/0080309 A1* | 3/2019 | Goodwin | ........... | G06Q 20/3672 |
| 2021/0158333 A1* | 5/2021 | Cohen | ................. | G06Q 10/109 |
| 2021/0201296 A1* | 7/2021 | Rule | ....................... | G06F 21/34 |
| 2022/0044243 A1* | 2/2022 | Rendahl | ................ | G06Q 10/10 |

* cited by examiner

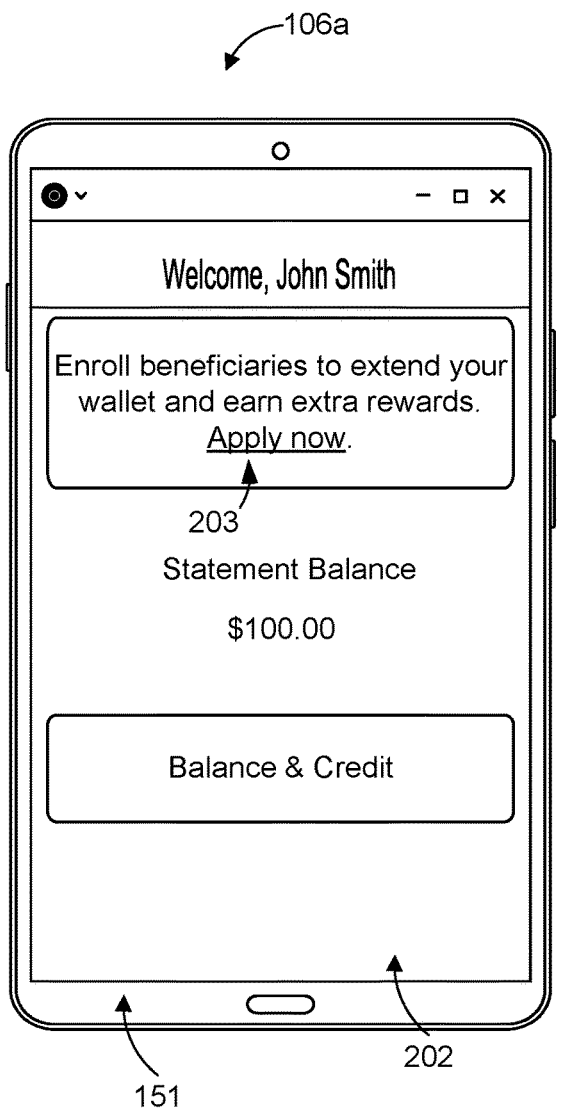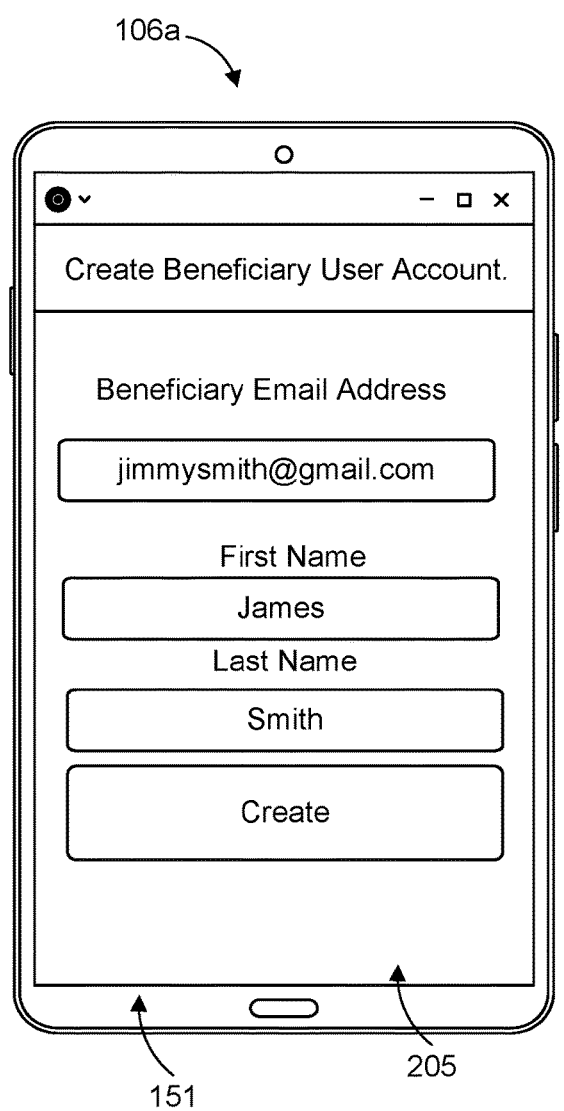
FIG. 2A
FIG. 2B

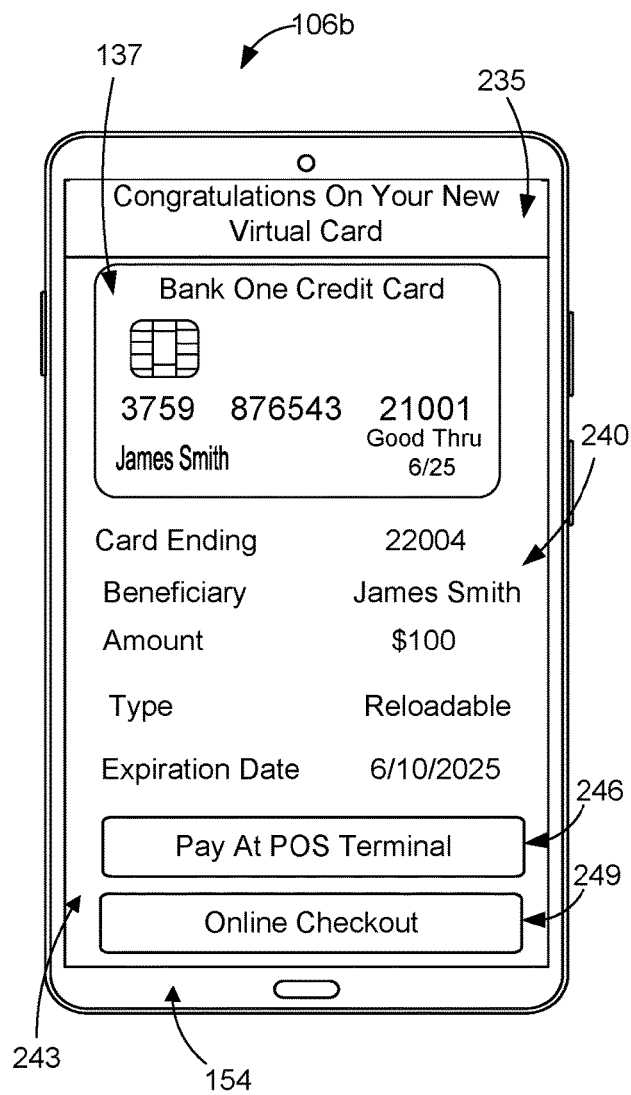
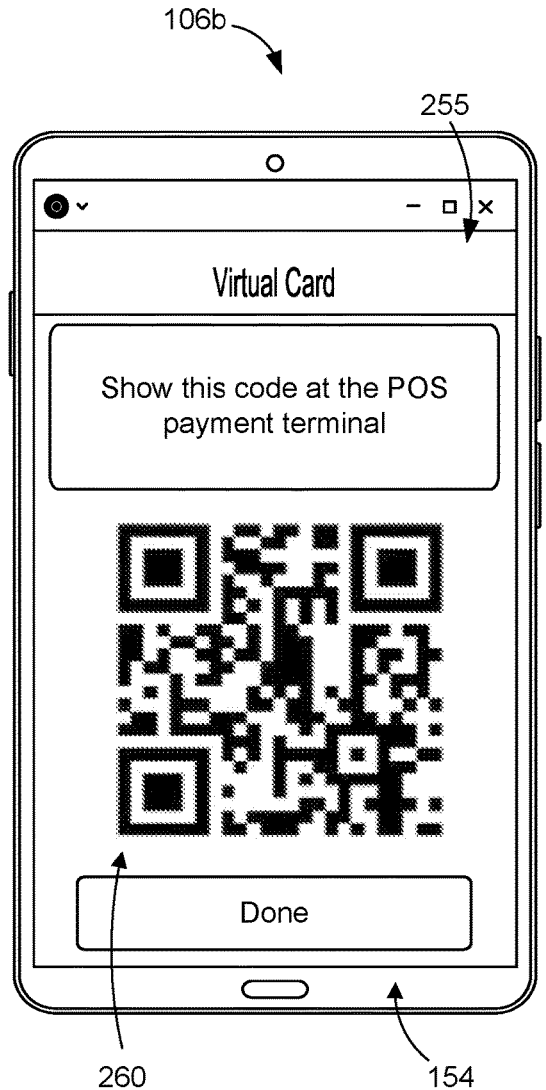
FIG. 2G     FIG. 2H

REMOTELY SHARING A PAYMENT INSTRUMENT TO A CLIENT DEVICE

BACKGROUND

An individual may have others that depend on them financially. For example, the individual may have a child, a sibling, an elderly parent, a friend, or others that can need financial assistance. In these instances, the individual can provide cash or a credit card in order to assist a loved one that has a financial need. However, the individual may desire a secure, near-instantaneous means for tracking and controlling the spending of authorized users of the account owned by the individual. Accordingly, an improved system and method for remotely sharing a payment instrument of a first user to a client device of a second user is desired.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 2A-2E illustrate example user interfaces of a payer wallet application displayed by a first client device in the networked environment of FIG. 1 according to various embodiments of the present disclosure.

FIGS. 2F-2H illustrate examples user interfaces of a beneficiary wallet application displayed by a second client device in the networked environment of FIG. 1 according to various embodiments of the present disclosure.

DETAILED DESCRIPTION

The embodiments of the present disclosure relate to remotely sharing a payment instrument of a first user to a client device of a second user. Many individuals would like to allow for others to make purchases using their payment instrument, such as allowing others to make a purchase using their debit, credit, or charge card. For example, parents might want their children to be able to make purchases using their debit, credit, or charge card accounts. As another example, businesses or employers might want their employees or agents to be able to make purchases using a company payment instrument (e.g., company debit, credit, or charge card) on behalf of the business or employer.

The existing methods for a financial account holder to share payment instrument access to others have many concerns and limitations. For example, a financial account holder cannot extend access to a payment instrument (e.g., a debit card, credit card, charge card, etc.) in real-time to authorized users who are not physically in the same location as the financial account holder. Secondly, when the payment instrument is shared, the authorized user can have full access to their payment instrument, and the financial account holder cannot limit the spending of the authorized user. Thirdly, security is a concern when the financial account holder shares their account information to an authorized user over emails, text messages, or verbally over the phone or in person. In these contexts, the account information can be exposed to unauthorized users.

Various embodiments of the present disclosure improve the functioning of a computer by remotely providing access to a payment instrument from a first client device of a first user to a second client device of a second user. The access is provided in a manner in which the first client device can monitor spending events and can limit the spending ability of the second client device in real-time or near real-time. In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
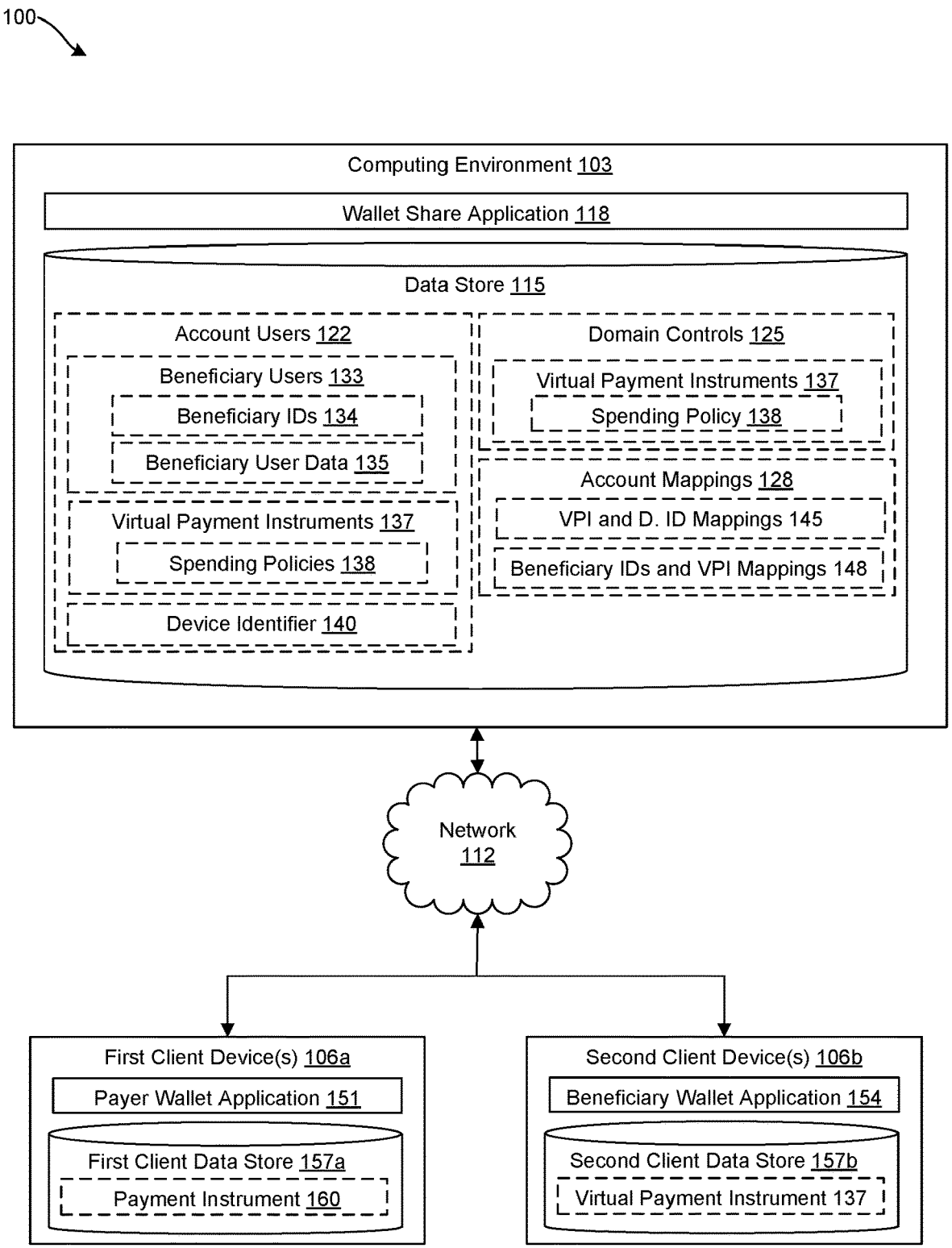
FIG. 1 is a drawing of a networked environment according to various embodiments of the present disclosure.

FIG. 1 depicts a networked environment 100 according to various embodiments. The networked environment 100 includes a computing environment 103, a first client device 106a, and a second client device 106b, which are in data communication with each other via a network 112. The network 112 includes, for example, the Internet, intranets, extranets, wide area networks (WANs), local area networks (LANs), wired networks, wireless networks, or other suitable networks, etc., or any combination of two or more such networks. For example, such networks can comprise satellite networks, cable networks, Ethernet networks, and other types of networks.

The computing environment 103 can include a server computer or any other system providing computing capability. Alternatively, the computing environment 103 can employ a plurality of computing devices that can be arranged, for example, in one or more server banks or computer banks or other arrangements. Such computing devices can be located in a single installation or can be distributed among many different geographical locations. For example, the computing environment 103 can include a plurality of computing devices that together can comprise a hosted computing resource, a grid computing resource and/or any other distributed computing arrangement. In some cases, the computing environment 103 can correspond to an elastic computing resource where the allotted capacity of processing, network, storage, or other computing-related resources can vary over time.

Various applications and/or other functionality can be executed in the computing environment 103 according to various embodiments. Also, various data is stored in a data store 115 that is accessible to the computing environment 103. The data store 115 can be representative of a plurality of data stores 115 as can be appreciated. The data stored in the data store 115, for example, is associated with the operation of the various applications and/or functional entities described below.

The components executed on the computing environment 103, for example, can include a wallet share application 118, and other applications, services, processes, systems, engines, or functionality not discussed in detail herein. The wallet share application 118 is executed to remotely share a payment instrument of a first user to a client device of a second user. The wallet share application 118 can be used to remotely share a payment instrument of a first user to the second client device 106b of a second user. The wallet share application 118 can enable the first client device 106a to monitor and limit the usage of the payment instrument by the second user.

The data stored in the data store 115 includes, for example, account user 122, domain controls 125, account mappings 128, and potentially other data. The account users 122 can represent various financial account holders. Each financial account holder can have one or more payment instrument accounts or funding accounts, such as a credit card, a debit card, a charge card, a checking account, a saving account, and other suitable financial accounts with a financial entity. The account user 122 can include various data related to one or more financial accounts for a user. Each account user 122 can include one or more beneficiary users 133, one or more virtual payment instruments 137, and one or more device identifiers 140.

The beneficiary users 133, who can also be referred to as authorized users, can represent an account for an individual that is receiving access to a temporary payment instrument from the account user 122. The temporary payment instrument is associated with the account user 122, in which the account user will pay for the charges made on the temporary payment instrument. Some non-limiting examples of individuals that can be considered a beneficiary user 133 can include children, elderly parents, friends, employees, agents, and other authorized users of the account user 122. Each beneficiary user 133 can include a beneficiary identifier 134 and beneficiary user data 135. The beneficiary identifier 134 can be a unique identifier for the account of the beneficiary user 133, and the beneficiary user data 135 can include identifying information (e.g., first name, last name), contact information (e.g., email, phone number) and other suitable data for the beneficiary user 133.

The virtual payment instrument 137 can represent a virtual payment card or a digital token for the beneficiary user 133. The virtual payment instrument 137 can be considered as a temporary payment instrument. The virtual payment instrument 137 can be used by the beneficiary user 133 for purchases. For example, the virtual payment instrument 137 can be presented at a point of sale (POS) terminal or used online in order to complete a transaction. The virtual payment instruments 137 can be created by the account user 122 and assigned to the beneficiary user 133. Purchases made using the virtual payment instrument 137 are charged to the account user 122.

The account user 122 can monitor spending events (e.g., purchases) generated by the beneficiary user 133 and can limit the spending capability of the virtual payment instrument 137. The account user 122 can apply one or more spending policies 138 to the virtual payment instrument 137. The spending policy 138 can include one or more spending constraints, restrictions, and/or limitations. Some non-limiting examples of a spending policy 138 can include an allocated spending limit, a frequency in which the allocated spending limit is provided (e.g., weekly, monthly, every two months), authorized spending categories (e.g., spending or transactions that are authorized for one or more categories of merchants or transactions, such as medical expenses, travel expenses, office supplies, academic expenses, etc.), prohibited spending categories (e.g., spending or transactions that are prohibited for certain categories of merchants or transactions, such as prohibiting spending or transactions at bars, liquor stores, casinos, etc.), a start date for the virtual payment instrument 137, an end date for the virtual payment instrument 137, and other suitable spending policy items.

The device identifier 140 can represent a unique identifier fora particular client device 106. The device identifier 140 can be stored and/or associated with other data, such as the virtual payment instrument 137, the beneficiary identifier 134, and other data. The device identifier 140 can be a phone number for the second client device 106b, a serial number for the second client device 106b (e.g., a unique device identifier from a device manufacturer), an identifier associated with a digital or mobile wallet executed on the second client device 106b (e.g., Apple Wallet, Google Wallet, etc.), and other suitable identifiers associated with a client device 106.

The domain controls 125 can represent data stored in association with virtual payment instruments 137 and their corresponding spending policies 138. When a purchase transaction is submitted for authorization, the domain controls 125 can be accessed to determine whether to authorize the purchase based at least in part on the spending policies 138 for the virtual payment instrument 137 submitted for the transaction. For example, a purchase transaction can be submitted for authorization, and the purchase transaction can be declined because the purchase transaction is submitted after the expiration date of the virtual payment instrument 137. As another example, the purchase transaction can be declined because the virtual payment instrument 137 has a spending policy 138 for medical expenses and the product associated with the purchase transaction is not classified as a medical expense.

The account mappings 128 can represent various data stored in association with other relevant data. A non-limiting example of an account mapping 128 can include a virtual payment instrument and device identifier mapping 145 that links a virtual payment instrument 137 to a device identifier 140. Another non-limiting example of an account mapping 128 can include a beneficiary identifier and virtual payment instrument mapping 148 that links a beneficiary identifier 134 and a virtual payment instrument 137. Another example of an account mapping 128 can include a mapping of a virtual payment instrument 137 to a funding account number (e.g., payment instrument account) of an account user 122.

The client devices 106a, 106b (collectively the "client devices 106") can be representative of a plurality of client devices that can be coupled to the network 112. The client devices 106 can comprise, for example, a processor-based system such as a computer system. Such a computer system can be embodied in the form of a desktop computer, a laptop computer, personal digital assistants, cellular telephones, smartphones, set-top boxes, music players, web pads, tablet computer systems, game consoles, electronic book readers, or other devices with like capability. The client devices 106 can include a display. The display can comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client devices 106 can be configured to execute various applications such as a payer wallet application 151, a beneficiary wallet application 154, and/or other applications. The payer wallet application 151 can be executed in a client device 106 (e.g., a first client device 106a) of an account user 122. The payer wallet application 151 can display various user interfaces (see e.g., FIGS. 2A-2E) for functionality available for the account user 122. The payer wallet application 151 can be used to create beneficiary users 133 and can be associated with the beneficiary users 133 of the account user 122. The payer wallet application 151 can be used to monitor and limit the use of a virtual payment instrument 137 assigned to a beneficiary user 133.

The beneficiary wallet application 154 can be executed in a client device 106 (e.g., a second client device 106b) assigned to a beneficiary identifier 134 (e.g., a beneficiary user). The beneficiary wallet application 154 can display various user interfaces (see e.g., FIGS. 2F-2H) for functionality available for the beneficiary identifier 134 of a beneficiary user 133. For example, the beneficiary wallet application 154 can be executed by a beneficiary user 133 to accept/activate a virtual payment instrument 137 provided by the account user 122. The beneficiary wallet application 154 can also be used to complete a purchase by presenting the virtual payment instrument 137 at a POS terminal, by providing the virtual payment instrument 137 to a web page during a checkout, or by providing the virtual payment instruments 137 in other suitable formats where payment information is required. The beneficiary wallet application 154 can also display the spending policies 138 associated with the virtual payment instrument 137. In some embodiments, the payer wallet application 151 and the beneficiary wallet application 154 can be combined into a single wallet application, in which functionality for the account user 122 and functionality for the beneficiary identifier 134 are partitioned from each other.

Other applications can be executed in the client devices 106, for example, to access network content served up by the computing environment 103 and/or other servers, thereby rendering a user interface on the display. To this end, the other applications can comprise, for example, a browser, a dedicated application, etc., and the user interface can comprise a network page, an application screen, etc.

Also, various data is stored in a first client data store 157a and a second client data store 157b (collectively "the client data stores 157") that are accessible to the first client device 106a and the second client device 106b. The data stored in the client data store 157, for example, is associated with the operation of the various applications and/or functional entities associated with the client devices 106. The first client data store 157a can include data associated with one or more payment instruments 160 for the account user 122. The second client data store 157b can include one or more virtual payment instruments 137 provided by the wallet share application 118.

Next, a general description of the operation of the various components of the networked environment 100 is provided. To begin, an account user 122 can desire to provide financial assistance to another individual (e.g., a son, a daughter, a friend, parent). The account user 122 can execute the payer wallet application 151 to add the other individual as a beneficiary user 133 to their account. The payer wallet application 151 can display various user interfaces (see e.g., FIGS. 2A-2E) for configuring a new beneficiary user 133. First, the payer wallet application 151 can display on the first client device 106a a user interface (see e.g., FIG. 2B) for entering beneficiary user data 135 (e.g., first name, last name, email address). After the information has been entered, the payer wallet application 151 can transmit a first request for creating a new beneficiary user 133, in which the first request includes the beneficiary user data 135.

The wallet share application 118 can receive the first request and create a new beneficiary identifier 134 for the new beneficiary user 133 based at least in part on the beneficiary user data 135. The wallet share application 118 can transmit to the payer wallet application 151 an indication that the new beneficiary user 133 has been added and associated with their account. At this point, the payer wallet application 151 can display an updated user interface (see e.g., FIG. 2C) that includes user interface buttons for adding another beneficiary user 133 or creating a virtual payment instrument 137 for the beneficiary user 133.

Upon clicking the "Add a Virtual Card" button, the payer wallet application 151 can display a user interface configured to receive one or more spending policies 138 for the virtual payment instrument 137. The account user 122 can enter spending policies 138, such as a spending limit, an effective start date, an effective end date, a frequency (e.g., recurring monetary amount on a weekly, monthly, or annual basis), and other suitable policies. After the spending policies 138 have been uploaded to the computing environment 103, the wallet share application 118 can transmit a hyperlink for the virtual payment instrument 137 to the second client device 106b. The wallet share application 118 can transmit the hyperlink via an email address, a phone number, or some other suitable means provided in the beneficiary user data 135.

Next, the second client device 106b of the other individual can receive the hyperlink from the computing environment 103 and can activate the hyperlink. The hyperlink can direct the second client device 106b to register the beneficiary user 133 with the computing environment 103. In some examples, the hyperlink can first direct the second client device 106b to download the beneficiary wallet application 154. The registration process can involve authenticating the other individual (e.g., beneficiary user 133) by requesting a user credential (e.g., validate an email address or phone number) from the intended beneficiary user 133. After the beneficiary user 133 has been authenticated, the beneficiary wallet application 154 can request profile information, such as name, contact information, login username, password, and other suitable profile information. After the profile information has been uploaded, the wallet share application 118 generates an account for the beneficiary user 133.

Next, the beneficiary wallet application 154 can be executed on the second client device 106b of the beneficiary user 133. The beneficiary wallet application 154 can display a user interface that includes a card representation of the virtual payment instrument 137, the spending policies 138, and checkout buttons for presenting the virtual payment instrument 137 in different checkout contexts (e.g., at a physical POS terminal or at a checkout web page). As such, the beneficiary user 133 can use the virtual payment instrument 137 to make purchases according to the spending policies 138.

To this end, the payer wallet application 151 can monitor and limit the usage of the virtual payment instrument 137. For instance, the payer wallet application 151 can receive a reporting of purchase events. Also, the payer wallet application 151 can modify the spending policies 138 in real-time or near real-time. For example, the payer wallet application 151 can allow the account user 122 to increase or decrease the spending limit, add or remove categories of acceptable purchases, change the expiration date of the virtual payment instrument 137, and other suitable adjustments.

Figures 2C, 2D:
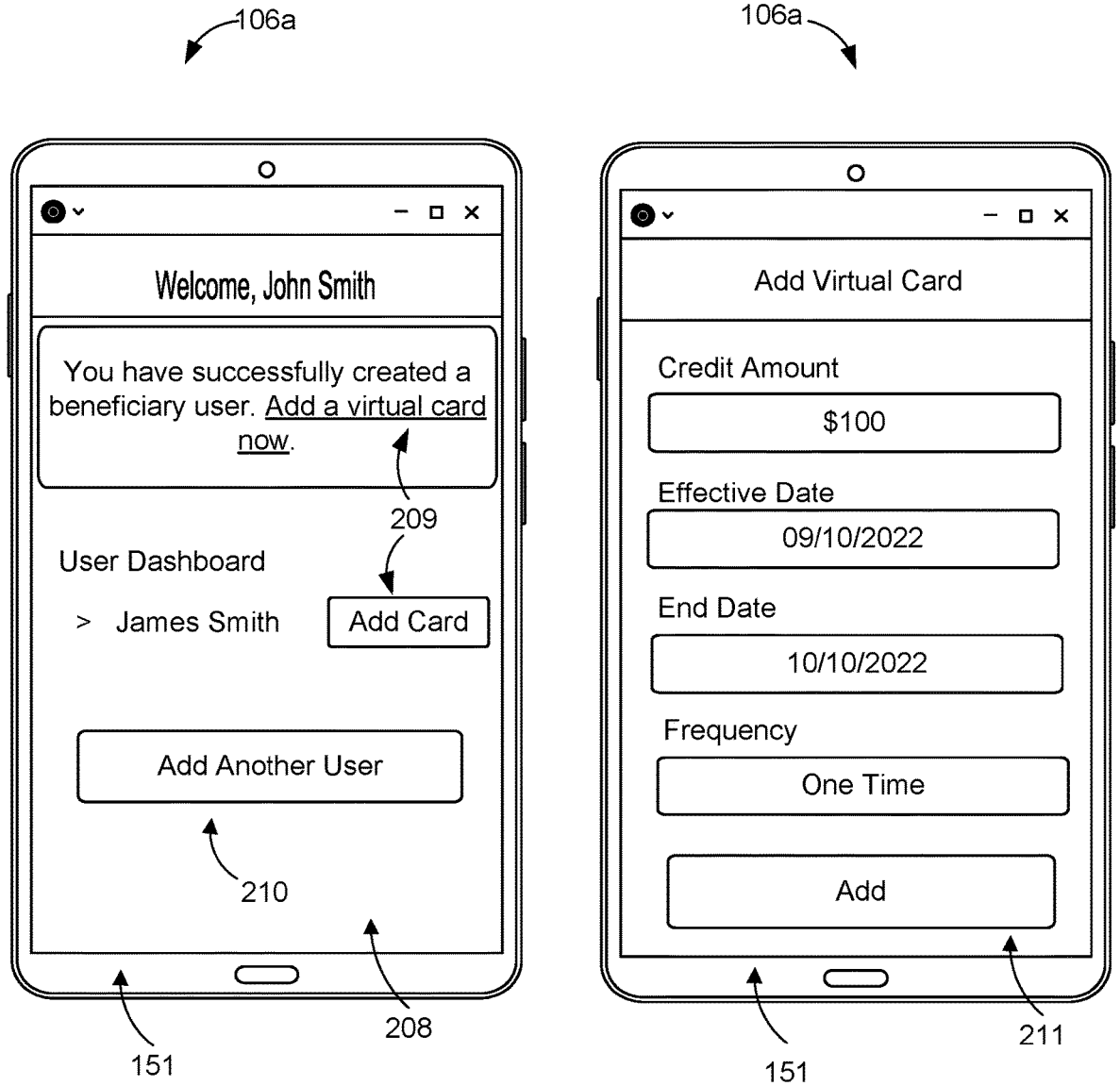

Referring next to FIGS. 2A-2E, shown are various user interfaces that can be displayed by the payer wallet application 151 on the first client device 106a. FIG. 2A illustrates an account overview interface 202 for the account user 122. The account overview interface 202 includes a hyperlink 203 for adding a beneficiary user 133.

Next, FIG. 2B illustrates the beneficiary user interface 205 for receiving beneficiary user data 135, and FIG. 2C illustrates a dashboard user interface 208 for the account user 122. The dashboard user interface 208 can indicate that the beneficiary user 133 has been created. The dashboard user interface 208 also includes a hyperlink 209 for adding a virtual payment instrument 137 (FIG. 1) (e.g., "Virtual Card" and "Add Card") and a user interface component 210 for creating another beneficiary user 133 (e.g., "Add Another User").

FIG. 2D illustrates the virtual payment user interface 211 for setting up a virtual payment instrument 137 for the beneficiary identifier 134. The virtual payment user interface 211 can include various input fields for spending policies 138. After the "Add" button has been clicked, the virtual payment instrument 137 (e.g., for "James Smith") will be linked to a payment instrument account or a funding account number (e.g., a credit card, a debit card, a charge card, etc.) of the account user 122 (e.g., for "John Smith").

Figure 2E:
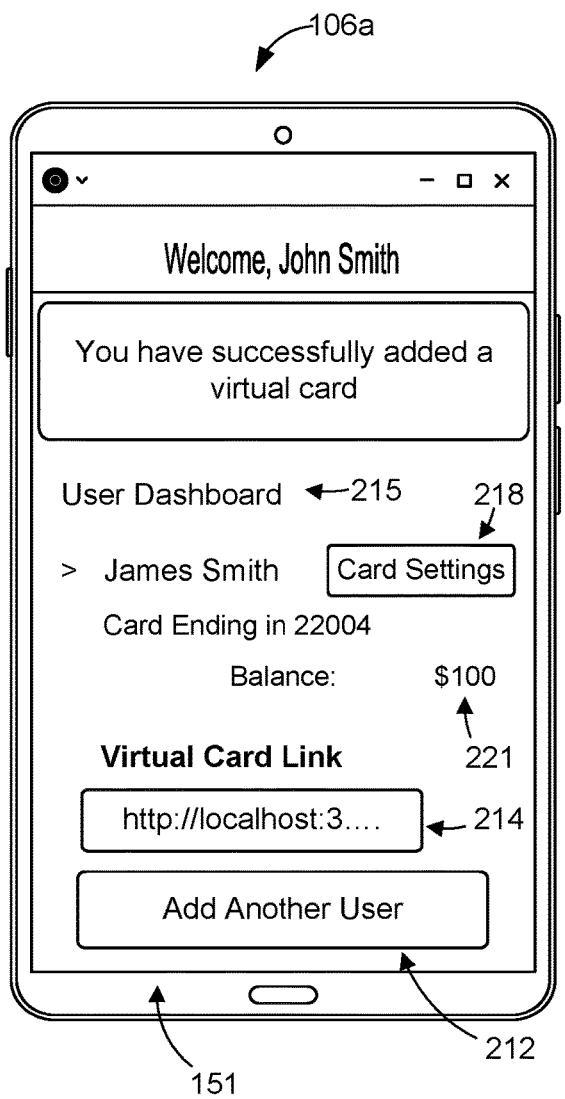

FIG. 2E illustrates an updated dashboard user interface 212 from FIG. 2C. The updated dashboard user interface 212 includes an indication that the virtual payment instrument 137 has been created, a hyperlink 214 for the virtual payment instrument 137, a User Dashboard 215, and an "Add Another User" button. As such, the virtual payment instrument 137 (e.g., for "James Smith") has been linked to the payment instrument account (e.g., credit card, debit card, charge card, etc.) of the account user 122 (e.g., "John Smith"). The account user 122 can designate which payment instrument account to apply the charges from the virtual payment instrument 137. The User Dashboard 215 can also include a "Card Settings" button 218, and a virtual payment instrument status 221. The "Card Settings" button 218 can be clicked for modifying the spending policies 138.

Figure 2F:

Turning to FIGS. 2F-2H, shown are various user interfaces that can be displayed by the beneficiary wallet application 154 on the second client device 106b. FIG. 2F illustrates an authentication user interface 230. The authentication user interface 230 can include an input field for receiving a user credential (e.g., an email address) and a prepopulated invitation code associated with the virtual payment instrument 137. The invitation code can include a string of numeric characters or alphanumeric characters. The invitation code can represent a unique identifier for an invitation for an intended user. The authentication user interface 230 includes buttons for confirming a user credential or using a different invitation code.

FIG. 2G illustrates a beneficiary dashboard interface 235 that includes an indication that the virtual payment instrument 137 has been configured for the beneficiary user 133, a card representation for the virtual payment instrument 137, spending policy area 240, and a checkout area 243. The card representation of the virtual payment instrument 137 can appear similar to a physical payment instrument and can include similar information, such as the name of the beneficiary user 133, a virtual payment instrument account number, expiration data (e.g., spending policy 138), and other suitable payment instrument data.

The spending policy area 240 can include the spending policies 138 associated with the virtual payment instrument 137. The checkout area 243 can include different user interface components for presenting the virtual payment instrument 137. The checkout area 243 can include a "Pay At POS Terminal" button 246 and an "Online Checkout" button 249.

FIG. 2H illustrates a terminal interface 255 that can be displayed from an individual clicking the "Pay At POS Terminal" button 246. The terminal interface 255 includes a bar code representation 260 of the virtual payment instrument 137. The bar code representation 260 can include a one-dimensional bar code, a two-dimensional bar code, and other bar code variations. The bar code representation 260 can be presented at the POS terminal in order for the POS terminal to receive the virtual payment instrument 137. In other embodiments, the terminal interface 255 can include other machine-readable formats, such as an alphanumeric code. Further, the client device 106 can implement other payment processing wireless protocols for communicating the virtual payment instrument 137 to a POS terminal. Some non-limiting examples include Near Field Communication (NFC), a Radio Frequency Identification (RFID), and other suitable contactless payment protocols.

Figure 3:
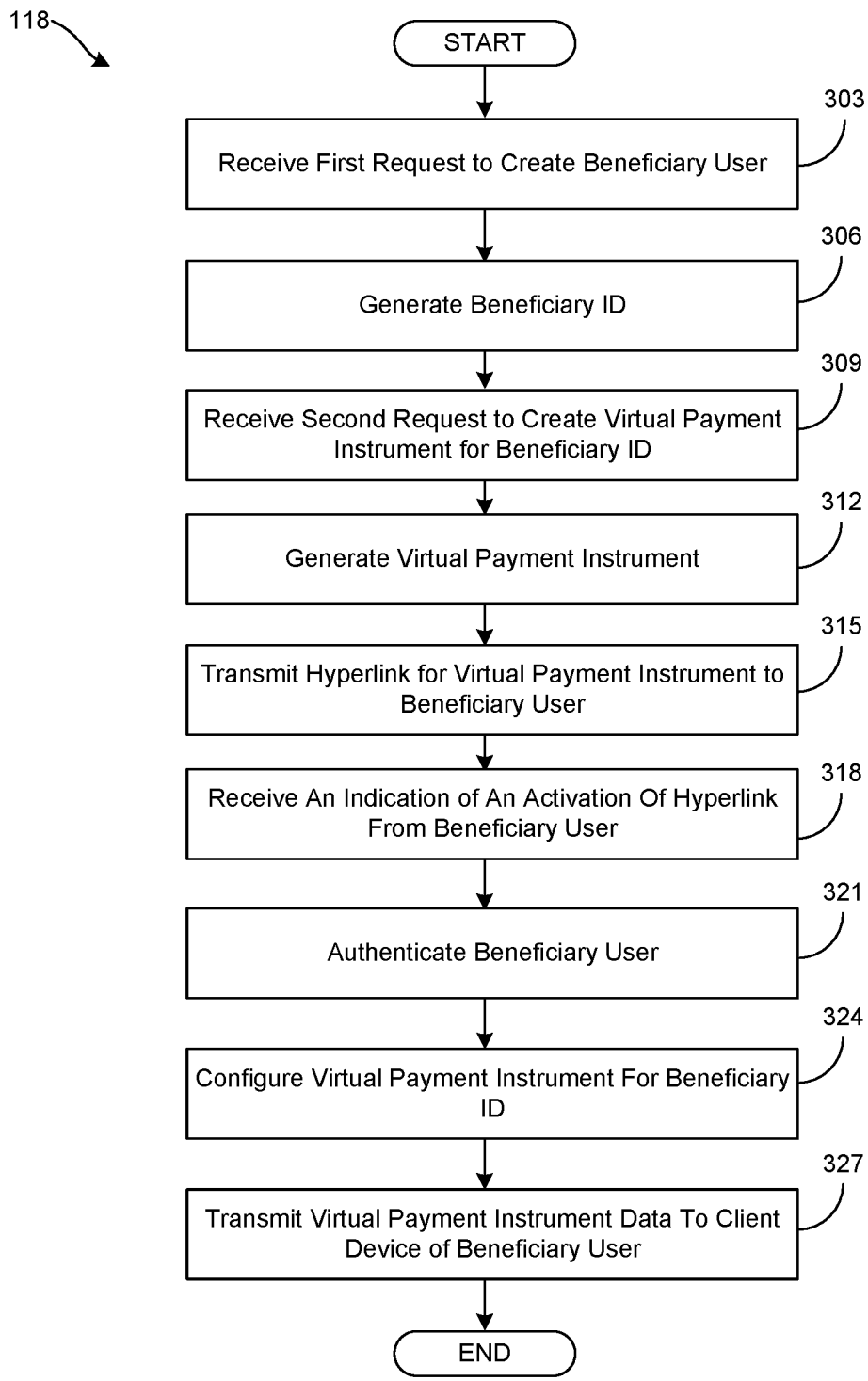
FIG. 3 is a flowchart illustrating one example of functionality implemented as portions of a wallet share application executed in the computing environment in the networked environment of FIG. 1 according to various embodiments of the present disclosure.

Referring next to FIG. 3, shown is a flowchart that provides one example of the operation of a portion of the wallet share application 118 according to various embodiments. It is understood that the flowchart of FIG. 3 provides merely an example of the many different types of functional arrangements that can be employed to implement the operation of the portion of the wallet share application 118 as described herein. As an alternative, the flowchart of FIG. 3 can be viewed as depicting an example of elements of a method implemented in the computing environment 103 (FIG. 1) according to one or more embodiments.

Beginning with box 303, the wallet share application 118 can receive a first request to create a beneficiary identifier 134 for a beneficiary user 133. The first request can be received from a first client device 106a of an account user 122. The account user 122 can transmit the first request in order to provide money to a beneficiary user 133. The beneficiary user 133, which could also be an authorized user, could be a child, a sibling, a friend, a parent, an employee, an agent, and other suitable individuals that the account user 122 would like to have access to the virtual payment instrument 137. The first request can include beneficiary user data 135 and an identifier or the payment instrument 160 for the account user 122. The beneficiary user data 135 can include one or more of a first name, a last name, an email address, a phone number, a social media username, and other suitable identifying information. The beneficiary user data 135 can be collected by the first client device 106a from one or more user interfaces from a web site or the payer wallet application 151. In some embodiments, the wallet share application 118 can direct the first client device 106a to download the payer wallet application 151.

In box 306, the wallet share application 118 can generate a beneficiary identifier 134 for the beneficiary user 133 based at least in part on the beneficiary user data 135. The beneficiary identifier 134 can be associated with the account user 122 that transmitted the first request.

In box 309, the wallet share application 118 can receive a second request from the first client device 106a to generate a virtual payment instrument 137. The second request can cause the wallet share application 118 to generate the virtual payment instrument 137 for one or more of the beneficiary identifiers 134 associated with the account user 122. The second request can include a reference to one or more beneficiary identifiers 134 and one or more spending policies 138 for the virtual payment instrument 137. Some non-limiting examples of a spending policy 138 can include a monetary limit, a frequency in which the monetary limit will be available to the beneficiary identifier 134, a start date for use of the virtual payment instrument 137, an end date for use of the virtual payment instrument 137, and other suitable spending policies 138.

In box 312, the wallet share application 118 can generate the virtual payment instrument 137 for the beneficiary identifier 134 based at least in part on the spending policy 138 and the beneficiary user data 135. The virtual payment instrument 137 can be associated with the beneficiary identifier 134. The virtual payment instrument 137 can be linked to a payment instrument account (e.g., a charge card, a credit card, a debit card) or a funding account number of the account user 122.

In box 315, the wallet share application 118 can transmit a hyperlink for accessing the virtual payment instrument 137 to the second client device 106b. The hyperlink can be emailed, sent via a text message, and other suitable means of data communication, which have been provided in the beneficiary user data 135. The virtual payment instrument 137 is configured to be restricted for a purchase based at least in part on the spending policy 138.

In box 318, the wallet share application 118 can receive an indication of an activation of the hyperlink from the second client device 106b of the beneficiary user 133 (e.g., associated with the beneficiary identifier 134). In response to receiving the indication, the wallet share application 118 can direct the second client device 106b to download a beneficiary wallet application 154 or display a web page. Either approach can display a user interface (e.g., via a web page) for authenticating the beneficiary user 133.

In box 321, the wallet share application 118 can authenticate the beneficiary user 133 for the beneficiary identifier 134 based at least in part on receiving response data in response to a user interface prompt. In some embodiments, the user interface prompt can request an email address associated with the virtual payment instrument 137. The information requested for authentication can vary.

In box 324, the wallet share application 118 can configure the virtual payment instrument 137 for the beneficiary identifier 134. The configuration of the virtual payment instrument 137 can involve associating the virtual payment instrument 137 with beneficiary identifier 134. In some examples, the configuration process involves associating the virtual payment instrument 137 with the device identifier 140 for the second client device 106b. In some embodiments, the wallet share application 118 coordinates the configuration of the virtual payment instrument 137 with the beneficiary wallet application 154 executed on the second client device 106b.

In box 327, the wallet share application 118 can transmit the virtual payment instrument 137 to the second client device 106b. The virtual payment instrument 137 can be represented as a digital token. In some examples, the virtual payment instrument 137 is stored into a digital or mobile wallet application executed on the second client device 106b. For example, the beneficiary wallet application 154 can receive and store the virtual payment instrument 137. Then, the depicted process ends, although the wallet share application 118 could continue execution to perform other functions.

Figure 4:
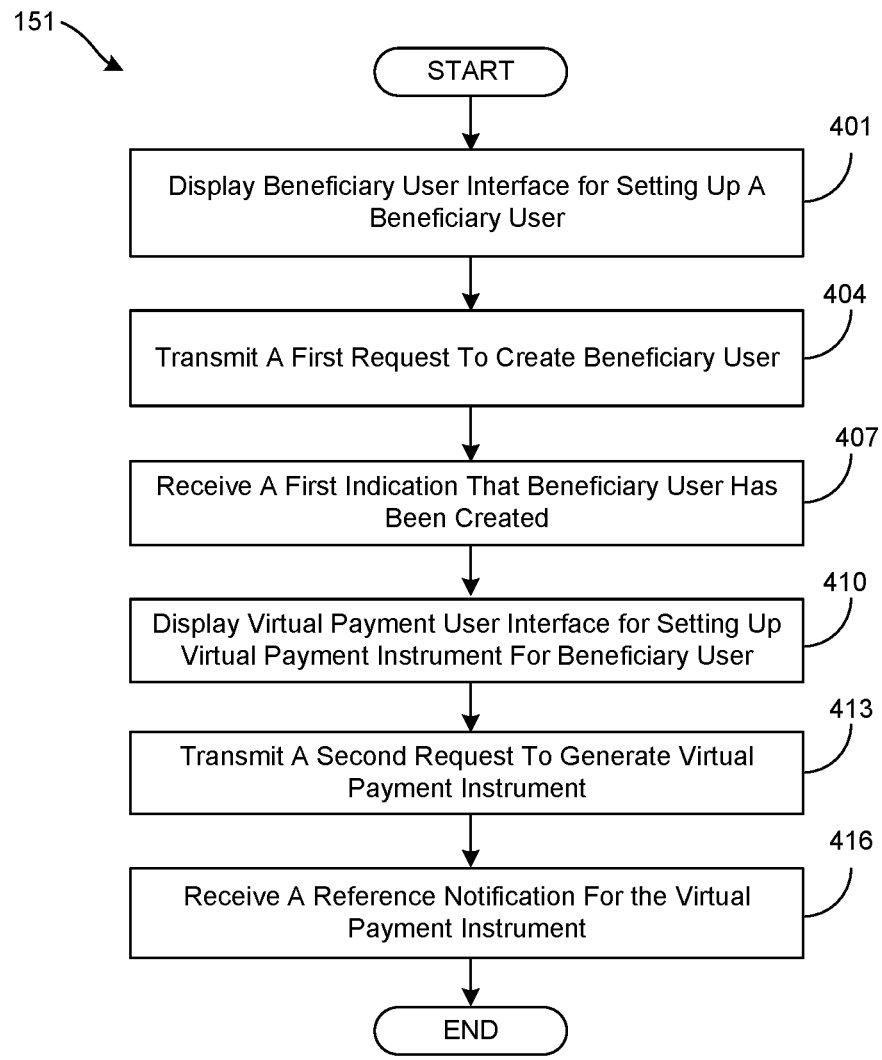
FIG. 4 is a flowchart illustrating one example of functionality implemented as portions of a payer wallet application executed in the computing environment in the networked environment of FIG. 1 according to various embodiments of the present disclosure.

Referring next to FIG. 4, shown is a flowchart that provides one example of the operation of a portion of the payer wallet application 151 according to various embodiments. It is understood that the flowchart of FIG. 4 provides merely an example of the many different types of functional arrangements that can be employed to implement the operation of the portion of the payer wallet application 151 as described herein. As an alternative, the flowchart of FIG. 4 can be viewed as depicting an example of elements of a method implemented in the computing environment 103 (FIG. 1) according to one or more embodiments.

Beginning with box 401, the payer wallet application 151 can display an account overview interface 202 for the account user 122 (FIG. 1). The account overview interface 202 can include a hyperlink for setting up a beneficiary user 133. Upon activation of the hyperlink, the payer wallet application 151 can display a beneficiary user interface 205 for setting up a beneficiary user 133. The beneficiary user interface 205 can display input fields for receiving beneficiary user data 135 (FIG. 1). For example, the beneficiary user interface 205 can receive an email address, a first name, and a last name of the intended beneficiary user. Upon entering the beneficiary user data 135 and clicking the "Create" button on the beneficiary user interface 205, the payer wallet application 151 can proceed to box 404.

In box 404, the payer wallet application 151 can transmit to the computing environment 103 a first request for creating a beneficiary identifier 134 for a beneficiary user 133. The first request can include the beneficiary user data 135 and an identifier for the account user 122 of the first client device 106a. In some implementations, the payer wallet application 151 can create the beneficiary identifier 134 for a beneficiary user 133. The payer wallet application 151 can transmit the beneficiary identifier 134 to the computing environment 103, in which the beneficiary identifier 134 would be stored for the beneficiary user 133.

In box 407, the payer wallet application 151 can receive an indication that the beneficiary identifier 134 has been generated. The payer wallet application 151 can display a dashboard user interface 208. The dashboard user interface 208 can include the identification that the beneficiary user 133 has been created, in which a beneficiary identifier 134 has been created for the beneficiary user 133. The dashboard user interface 208 also includes hyperlinks for adding a virtual payment instrument 137 (FIG. 1) (e.g., "Virtual Card" and "Add Card" in FIG. 2C) and a user interface component for creating another beneficiary user 133 (e.g., "Add Another User" in FIG. 2C). Upon clicking one of the hyperlinks for adding the virtual payment instrument 137 by the account user 122 on the first client device 106a, the payer wallet application 151 can proceed to box 410.

In box 410, the payer wallet application 151 can display a virtual payment user interface 211 for setting up a virtual payment instrument 137 for the beneficiary identifier 134. The virtual payment user interface 211 can include various input fields for spending policies 138. Upon finishing the entry of the spending policies 138 and clicking the "Add" button, the payer wallet application 151 can proceed to box 413.

In box 413, the payer wallet application 151 can transmit to the computing environment 103 a second request to generate the virtual payment instrument 137. The second request can include the spending policies 138.

In box 416, the payer wallet application 151 can receive from the computing environment 103 a hyperlink for the virtual payment instrument 137. The payer wallet application 151 can display an updated dashboard user interface 212 (that includes an indication that the virtual payment instrument 137 has been created), the hyperlink for the virtual payment instrument 137, a User Dashboard 215, and an "Add Another User" button.

The User Dashboard 215 can include a "Card Settings" button 218, and a virtual payment instrument status 221. The "Card Settings" button 218 can be clicked for modifying the spending policies 138. Thus, spending policies 138 can be added or removed for the virtual payment instrument 137. The virtual payment instrument status 221 can report various data related to the current status of the virtual payment instrument 137, such as purchase events, a remaining balance, and other related financial data. In some embodiments, the wallet share application 118 can transmit the hyperlink for the virtual payment instrument 137 to the second client device 106b based at least in part on the contact information provided in the beneficiary user data 135. The first client device 106a can also transmit a reference notification for the virtual payment instrument 137 to the second client device 106b. The reference notification can include a hyperlink for accessing the virtual payment instrument. Then, the depicted process ends, although the payer wallet application 151 could continue execution to perform other functions.

Figure 5:
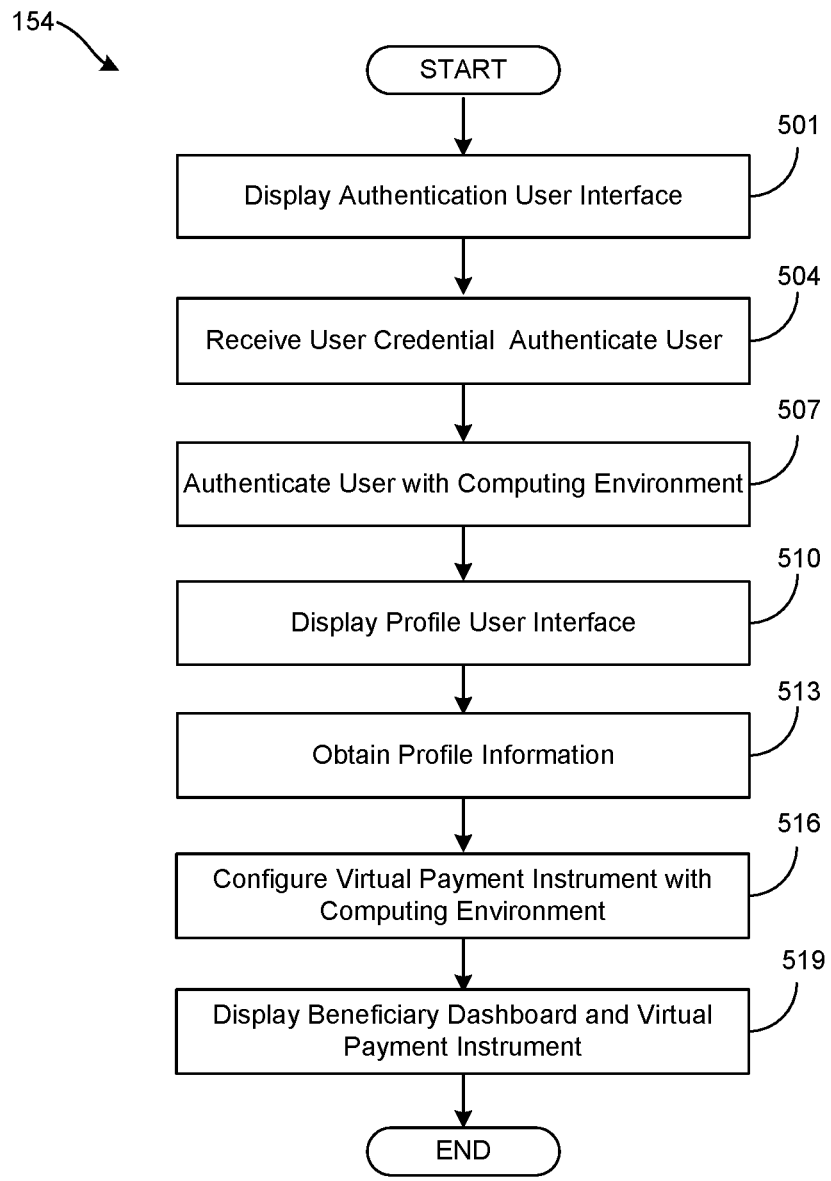
FIG. 5 is a flowchart illustrating one example of functionality implemented as portions of beneficiary wallet application executed in the computing environment in the networked environment of FIG. 1 according to various embodiments of the present disclosure.

Referring next to FIG. 5, shown is a flowchart that provides one example of the operation of a portion of the beneficiary wallet application 154 according to various embodiments. It is understood that the flowchart of FIG. 5 provides merely an example of the many different types of functional arrangements that can be employed to implement the operation of the portion of the beneficiary wallet application 154 as described herein. As an alternative, the flowchart of FIG. 5 can be viewed as depicting an example of elements of a method implemented in the computing environment 103 (FIG. 1) according to one or more embodiments.

Beginning with box 501, the second client device 106b can receive an invitation notification that includes the hyperlink for the virtual payment instrument 137. The invitation notification can be received from the computing environment 103 or the first client device 106a. The user of the second client device 106b can activate the hyperlink from the invitation notification. In some embodiments, the hyperlink can direct the second client device 106b to download the beneficiary wallet application 154. The beneficiary wallet application 154 can display an Authentication User Interface 230. The Authentication User Interface 230 can include an input field for receiving a user credential (e.g., an email address) and a prepopulated Invitation Code associated with the virtual payment instrument 137. The Invitation Code can include a string of numeric characters or alphanumeric characters. The Invitation Code can represent a unique identifier for an invitation for an intended user (e.g., targeted beneficiary user 133). The Invitation Code can include a string of numeric characters or alphanumeric characters. The Invitation Code can represent a unique identifier for an invitation for an intended user.

In box 504, the beneficiary wallet application 154 can receive the user credential in response to the user clicking the "Confirm Email" button. In box 507, the beneficiary wallet application 154 can authenticate the user as the intended beneficiary user 133 by transmitting the user credential to the computing environment 103. Upon successful authentication, the beneficiary wallet application 154 can proceed to box 510.

In box 510, the beneficiary wallet application 154 can display a profile user interface for receiving profile information associated with the beneficiary user 133. The profile user interface can display input fields for receiving the information that was not provided by the account user 122 or information that the beneficiary user 133 can want to modify (e.g., contact information).

In box 513, upon clicking a "Create" button, the beneficiary wallet application 154 can obtain the profile information. The profile information may include the beneficiary user 133 specifying a username, a password, an email address, a phone number, settings for the beneficiary wallet application 154, and other suitable profile information.

In box 516, the beneficiary wallet application 154 can configure the virtual payment instrument 137 by transmitting the profile information to the computing environment 103. The profile information can be stored as beneficiary user data 135 in the computing environment 103. Upon processing, the computing environment 103 can transmit an indication to the beneficiary wallet application 154 that the virtual payment instrument 137 has been configured for the beneficiary user 133. The beneficiary wallet application 154 can proceed to box 519.

In box 519, the beneficiary wallet application 154 can display a beneficiary dashboard interface 235. The beneficiary dashboard interface 235 includes a card representation for the virtual payment instrument 137, a spending policy area 240, a checkout area 243, and an indication that the virtual payment instrument 137 has been configured for the beneficiary user 133. The card representation of the virtual payment instrument 137 can appear similar to a physical payment instrument and can include similar information, such as the name of the beneficiary user 133, a virtual payment instrument account number, expiration data (e.g., spending policy 138), and other suitable payment instrument data.

The spending policy area 240 can include the spending policies 138 associated with the virtual payment instrument 137. The checkout area 243 can include different user interface components for presenting the virtual payment instrument 137, such as a "Pay At POS Terminal" button 246 and an "Online Checkout" button 249. Upon clicking the "Pay At POS Terminal" button 246, the beneficiary wallet application 154 can generate a terminal interface 255 (FIG. 2H) that includes a bar code representation 260 of the virtual payment instrument 137. The bar code representation 260 can be presented at the POS terminal in order for the POS terminal to receive the virtual payment instrument 137. The "Online Checkout" button 249 can be clicked to provide the virtual payment instrument 137 for a checkout web page. Then, the depicted process ends, although the beneficiary wallet application 154 could continue execution to perform other functions.

Figure 6:
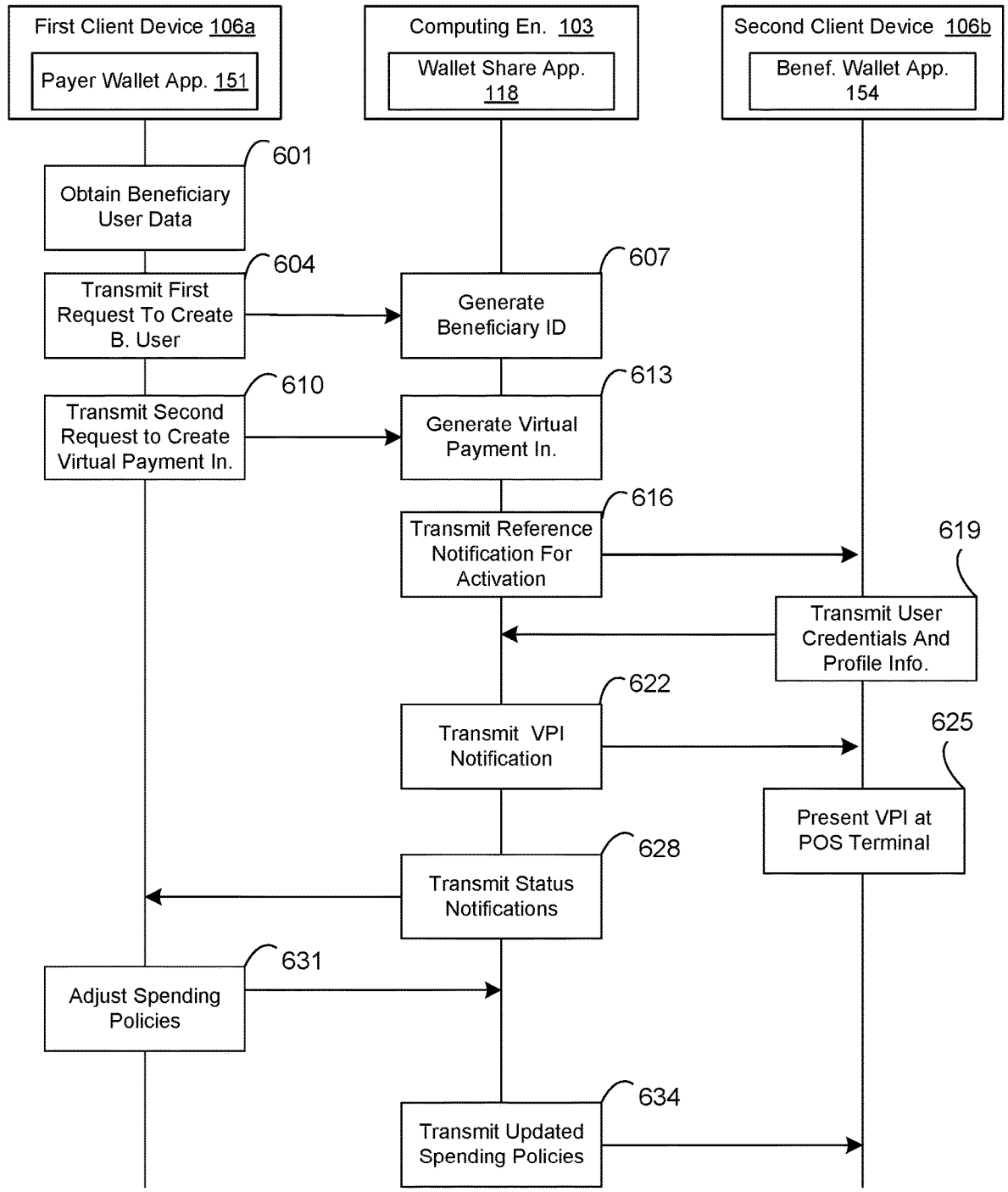
FIG. 6 is a sequence diagram depicting an example of the interactions between the various components of the networked environment of FIG. 1 according to various embodiments of the present disclosure.

FIG. 6 is a sequence diagram depicting an example of the interactions between the various components of the networked environment of FIG. 1. It is understood that the sequence diagram of FIG. 6 provides merely an example of the many different types of functional arrangements that can be employed to implement the portions of the networked environment 100 as described herein. As an alternative, the sequence diagram of FIG. 6 can be viewed as depicting an example of elements of a method implemented within the networked environment 100 in some implementations.

Beginning with box 601, the payer wallet application 151 can obtain beneficiary user data 135 for setting up a new beneficiary user 133. The beneficiary user data 135 can be obtained using the beneficiary user interface 205. For example, the beneficiary user interface 205 can obtain an email address, a first name, and a last name of the intended beneficiary user 133.

Proceeding to box 604, the payer wallet application 151 can transmit a first request to the computing environment 103 to create a beneficiary identifier 134 for the beneficiary user 133. The first request can include the beneficiary user data 135 and an identifier for the account user 122 of the first client device 106a. In some implementations, the payer wallet application 151 can create the beneficiary identifier 134 for the beneficiary user 133. The payer wallet application 151 can transmit the beneficiary identifier 134 to the computing environment 103 for storing.

Proceeding to box 607, the wallet share application 118 can generate a beneficiary identifier 134 for the beneficiary user 133 based at least in part on the beneficiary user data 135. The beneficiary identifier 134 can be associated with the account user 122. In some embodiments, the wallet share application 118 can transmit an indication to the payer wallet application 151 that the new beneficiary user 133 has been added to the account of the account user 122.

Next at box 610, the payer wallet application 151 can obtain an indication from a user interface that the account user 122 desires to create a virtual payment instrument 137. The payer wallet application 151 can obtain one or more spending policies 138 through the beneficiary user interface 205. The payer wallet application 151 can transmit a second request to the computing environment 103 to create a virtual payment instrument 137 for the beneficiary user 133.

Proceeding to box 613, the wallet share application 118 can generate the virtual payment instrument 137 for the beneficiary identifier 134 based at least in part on the second request. The second request can include one or more spending policies 138, the beneficiary identifier 134, and other suitable data. The virtual payment instrument 137 can be linked to a payment instrument account (e.g., a charge card, a credit card, a debit card) or a funding account number of the account user 122 for the first client device 106a.

Next in box 616, the wallet share application 118 can transmit a reference notification to the second client device 106b. The reference notification can include a hyperlink for authenticating the beneficiary user 133 and providing access to the virtual payment instrument 137. In some embodiments, the hyperlink can direct the second client device 106b to download the beneficiary wallet application 154 from a computing device (e.g., in the computing environment 103). In other embodiments, the hyperlink can direct the second client device 106b to one or more web pages for authenticating the beneficiary user 133.

Proceeding to box 619, the second client device 106b can activate the reference notification (e.g., a hyperlink) to authenticate the beneficiary user 133. For example, the second client device 106b can transmit user credentials and/or identifying information (e.g., an email address, answers to security questions, temporary password, etc.) to authenticate the beneficiary user 133. After the beneficiary user 133 has been authenticated, the second client device 106b can transmit profile information (e.g., beneficiary user data 135) for completing an account for the beneficiary user 133. For example, the second client device 106b can obtain and transmit to the computing environment 103 a username, password, contact information, a device identifier 140 associated with the second client device 106b, and other suitable identifying information associated with the second client device 106b and the beneficiary user 133. In some embodiments, the device identifier 140 is automatically extracted in association with second client device 106b. In other examples, the device identifier 140 can be determined based on a native or thirty electronic wallet application executed on the second client device 106b.

Proceeding to box 622, the wallet share application 118 can receive the profile information and associate it with the beneficiary user 133. In some embodiments, at this point, the wallet share application 118 can direct the second client device 106b to download and install the beneficiary wallet application 154. The wallet share application 118 can transmit a virtual payment instrument notification to the second client device 106b. The virtual payment instrument notification can include data to access the virtual payment instrument 137. For example, the wallet share application 118 can transmit a digital token, an alphanumeric character string, or other suitable means for representing the virtual payment instrument 137.

Next at box 625, the beneficiary wallet application 154 can generate a machine-readable representation of the virtual payment instrument 137 for a POS terminal at a physical store, as one non-limiting example. For instance, the beneficiary wallet application 154 can generate a bar code representation of the virtual payment instrument 137, which can be scanned by a scanner for the physical store. In some embodiments, the wallet share application 118 can apply the spending policy 138 of the virtual payment instrument 137 to the transaction. The application of the spending policy 138 can determine whether the transaction violates one or more restrictions associated with the spending policy. After the spending policy 138 has been considered and cleared, the purchase transaction can proceed.

At box 628, in some embodiments, the wallet share application 118 can transmit status notification to the payer wallet application 151 for the virtual payment instrument 137. The status notification can include information, such as a remaining balance for the virtual payment instrument 137, reporting of purchases (items, transaction time, transaction location, etc.), and other suitable purchasing information.

At box 631, the payer wallet application 151 can obtain through a user interface a change in the spending policy 138. For example, the beneficiary user 133 can enter an extension of the time period, add or remove a spending category, and adjust other suitable spending policy items.

Proceeding to box 634, the wallet share application 118 can transmit the updated spending policies 138 to the beneficiary wallet application 154. The updated spending policies 138 can be displayed on the second client device 106b. Then, the depicted process ends, although the wallet share application 118, the payer wallet application 151, and the beneficiary wallet application 154 could continue execution to perform other functions.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-5 represent the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts of FIG. 3, FIG. 4, and FIG. 5 follow a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts of FIG. 3, FIG. 4, and FIG. 5 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) can also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, and/or Z, or any combination thereof (e.g., X; Y; Z; X and/or Y; X and/or Z; Y and/or Z; X, Y, and/or Z, etc.). Thus, such disjunctive language is not generally intended to, and should not, imply that certain embodiments require at least one of X, at least one of Y, and/or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and Therefore, the following is claimed:

1. A system, comprising:
a computing device comprising a processor and a memory; and
machine-readable instructions stored in the memory that, when executed by the processor, cause the computing device to at least:
receive a first request from a first client device to generate a beneficiary user for a payment instrument account, the first request comprising beneficiary user data;
generate a beneficiary identifier for the beneficiary user based at least in part on the beneficiary user data, wherein the beneficiary identifier is associated with the payment instrument account;
receive a second request from the first client device to generate a virtual payment instrument for the beneficiary identifier, the second request comprising a spending policy;
generate the virtual payment instrument for a second client device associated with the beneficiary identifier based at least in part on the spending policy;
link the virtual payment instrument with a device identifier for the second client device based at least in part on the beneficiary user data;
generate a hyperlink for configuring the virtual payment instrument based at least in part on the generation of the virtual payment instrument for the second client device;
transmit a notification that includes the hyperlink for configuring the virtual payment instrument to the second client device based at least in part on the device identifier the virtual payment instrument is configured to be restricted for a purchase based at least in part on the spending policy;
authenticate the second client device based at least in part on an activation of the hyperlink by the second client device; and
transmit a wallet application for configuring the virtual payment instrument to the second client device based at least in part on the authentication of the second client device.

2. The system of claim 1, wherein the spending policy comprises at least one of an amount that can be paid using the payment instrument account, a start date for the virtual payment instrument, an ending date for the virtual payment instrument, or a spend frequency for the virtual payment instrument.

3. The system of claim 1, wherein the machine-readable instructions, when executed by the processor, cause the computing device to at least:
receive an indication that the second client device has activated the hyperlink from the notification;
transmit data for displaying an authentication user interface on the second client device; and
authenticate the beneficiary identifier based at least in part on receiving a user credential from the second client device.

4. The system of claim 1, wherein the machine-readable instructions, when executed by the processor, cause the computing device to at least:
receive an indication that the second client device has activated the hyperlink from the notification;
transmit data for displaying a user interface on the second client device;
receive beneficiary profile data from the user interface, wherein the beneficiary profile data comprises a device identifier associated with the second client device; and
configure the beneficiary identifier for the beneficiary user based at least in part on the beneficiary profile data from the user interface.

5. The system of claim 4, wherein the machine-readable instructions, when executed by the processor, cause the computing device to at least:
store the device identifier of the second client device in association with the beneficiary identifier.

6. The system of claim 4, wherein the machine-readable instructions, when executed by the processor, cause the computing device to at least:
transmit to the second client device a second hyperlink for a beneficiary wallet application, wherein upon activation, the second hyperlink directs the second client device to download the beneficiary wallet application.

7. The system of claim 1, wherein the machine-readable instructions, when executed by the processor, cause the computing device to at least:
transmit to the second client device a digital token associated with the beneficiary identifier in response to configuring the beneficiary identifier for the second client device.

8. A computer-implemented method comprising:
displaying, by a first client device, a beneficiary user interface for creating a beneficiary user;
obtaining, by the first client device, beneficiary user data using the beneficiary user interface, the beneficiary user data comprising a device identifier;
transmitting, by the first client device, to a computing device the beneficiary user data for generating the beneficiary user, wherein the beneficiary user is associated with a payment instrument account of the first client device;
displaying, by the first client device, a virtual payment user interface for creating a virtual payment instrument associated with the beneficiary user;
receiving, by the first client device, a spending policy from the virtual payment user interface;
transmitting, by the first client device, to the computing device the spending policy for generating the virtual payment instrument, wherein the virtual payment instrument is associated with the beneficiary user;
displaying, by the first client device, a reference notification that includes a hyperlink for configuring the virtual payment instrument associated with the beneficiary user, the virtual payment instrument being linked to the device identifier and the reference notification being received from the computing device; and
transmitting, by the first client device, the hyperlink displayed for the reference notification to a second client device of the beneficiary user using the device identifier associated with the second client device, wherein the virtual payment instrument is restricted for a purchase based at least in part on the spending policy.

9. The method of claim 8, wherein the spending policy comprises at least one of an amount that can be paid using the payment instrument account, a start date for the virtual payment instrument, an ending date for the virtual payment instrument, or a spend frequency for the virtual payment instrument.

10. The method of claim 8, wherein the spending policy comprises a first spending policy, and further comprising:

displaying, by the first client device, a dashboard user interface which includes a status for the virtual payment instrument associated with the beneficiary user; and transmitting, by the first client device, a second spending policy to the computing device based at least in part on obtaining the second spending policy using the virtual payment user interface.

11. The method of claim 10, wherein the status comprises a spending history for the virtual payment instrument associated with the beneficiary user.

12. The method of claim 8, further comprising:

displaying, by the first client device, a dashboard user interface that includes an indication that the beneficiary user has been generated and associated with the payment instrument account.

13. The method of claim 12, wherein the dashboard user interface includes a virtual card user interface component that is configured to display the virtual payment user interface for generating a second virtual payment instrument in association with the payment instrument account.

14. The method of claim 12, wherein the beneficiary user comprises a first beneficiary user, and the dashboard user interface includes a beneficiary user component that is configured to display the beneficiary user interface for adding a second beneficiary user in association with the payment instrument account.

15. The method of claim 8, wherein the reference notification is displayed in a dashboard user interface that includes a button user interface component configured for modifying the spending policy.

16. A non-transitory, computer-readable medium, comprising machine-readable instructions that, when executed by a processor of a first client device, cause the first client device to at least:

display a first user interface for creating a beneficiary user;

obtain beneficiary user data using the first user interface, the beneficiary user data comprising a device identifier;

transmit to a computing device the beneficiary user data to generate a beneficiary user, wherein the beneficiary user is associated with a payment instrument account;

display a third user interface for creating a virtual payment instrument associated with the beneficiary user;

obtain a spending policy through the third user interface;

transmit to the computing device the spending policy for generating the virtual payment instrument, wherein the virtual payment instrument is associated with the beneficiary user;

display a hyperlink for accessing the virtual payment instrument associated with the beneficiary user in a fourth user interface, the hyperlink being received from the computing device and the virtual payment instrument being linked to the device identifier, wherein the virtual payment instrument is configured to be restricted for a purchase based at least in part on the spending policy; and transmit the hyperlink for registering the virtual payment instrument to a second client device of the beneficiary user using a device identifier associated with the second client device.

17. The non-transitory, computer-readable medium of claim 16, wherein the spending policy comprises at least one of an amount that can be paid using the payment instrument account, a start date for the virtual payment instrument, an ending date for the virtual payment instrument, or a spend frequency for the virtual payment instrument.

18. The non-transitory, computer-readable medium of claim 16, wherein the virtual payment user interface comprises an amount entry and a frequency entry.

19. The non-transitory, computer-readable medium of claim 16, wherein the fourth user interface includes a button user interface component configured for modifying the spending policy.

20. The non-transitory, computer-readable medium of claim 16, wherein the spending policy comprises a first spending policy, and the machine-readable instructions that, when executed by the processor, cause the first client device to at least:

the fourth user interface includes a status for the virtual payment instrument associated with the beneficiary user; and transmit a second spending policy to the computing device based at least in part on obtaining the second spending policy through the fourth user interface.

* * * * *